(12) United States Patent
Bee (10) Patent No.: US 8,863,021 B1
(45) Date of Patent: Oct. 14, 2014

(54) SCHEDULING CALENDAR EVENTS FOR TASKS

(75) Inventor: Gavin Edward Bee, Kitchener (CA)

(73) Assignee: Google Inc., Mountain View, CA (US)

( * ) Notice: Subject to any disclaimer, the term of this patent is extended or adjusted under 35 U.S.C. 154(b) by 167 days.

(21) Appl. No.: 13/559,326

(22) Filed: Jul. 26, 2012

(51) Int. Cl.
- *G06F 3/048* (2013.01)
- *G06F 15/16* (2006.01)
- *G06F 9/46* (2006.01)
- *G06F 3/023* (2006.01)
- *G06F 3/0481* (2013.01)

(52) U.S. Cl.
CPC ............ *G06F 3/0237* (2013.01); *G06F 3/0481* (2013.01)
USPC .............................. 715/780; 709/206; 718/103

(58) Field of Classification Search
CPC .............................. G06F 3/0237; G06F 3/0481
USPC .............................. 715/780; 709/206; 718/103
See application file for complete search history.

(56) References Cited

U.S. PATENT DOCUMENTS

| | | | | |
|---|---|---|---|---|
| 8,495,501 | B2 * | 7/2013 | Kadashevich et al. | 715/747 |
| 2009/0313074 | A1 * | 12/2009 | Harpur et al. | 705/9 |
| 2011/0307598 | A1 * | 12/2011 | Orr et al. | 709/224 |
| 2013/0060593 | A1 * | 3/2013 | Motoyama | 705/7.19 |
| 2013/0191836 | A1 * | 7/2013 | Meyer | 718/103 |
| 2013/0212197 | A1 * | 8/2013 | Karlson | 709/206 |

* cited by examiner

*Primary Examiner* — David Phantana Angkool

(74) *Attorney, Agent, or Firm* — McDermott Will & Emery LLP (57) ABSTRACT

A system and method for scheduling tasks in a calendar of a user. Multiple task entries are received from the user, and the task entries are ranked based on a deadline of each of the task entries. A length of time required to complete each task entry is determined, and a time-consuming calendar entry for each task entry is created in the calendar of the user based on the ranking of each task entry, the determined length of time required to complete each task entry, and existing calendar entries in the calendar of the user. The created time-consuming calendar entries are provided to the user. Machine-readable media are also provided.

23 Claims, 5 Drawing Sheets

SCHEDULING CALENDAR EVENTS FOR TASKS

BACKGROUND

The present disclosure generally relates to electronic calendar and task management applications, and more particularly to scheduling tasks in a calendar of a user.

Users of existing calendar systems may also use task scheduling systems. Existing integrated systems may provide both calendar and task management capabilities. Calendar systems allow users to create an entry directly in the calendar to indicate a block of time in the user's calendar that is allocated to a particular event. Task systems allow users to create tasks with deadlines for completion. Some systems integrating task capabilities into calendar systems provide a visual indicator of the deadline of a user's task in that user's calendar.

SUMMARY

The disclosed subject matter relates to scheduling tasks in a calendar of a user. The method may include receiving a plurality of task entries from a user and ranking the plurality of task entries based on a deadline of each of the task entries. The method further includes determining a length of time required to complete each task entry and creating a time-consuming calendar entry for each task entry in the calendar of the user based on the ranking of each task entry, the determined length of time required to complete each task entry, and existing calendar entries in the calendar of the user. The method additionally provides the created time-consuming calendar entries to the user.

The disclosed subject matter further relates to a system for providing for scheduling tasks in a calendar of a user. The system includes one or more processor(s) and a memory containing processor-executable instructions. When executed by the processor(s), the system receives a task entry from a user and determines a length of time required to complete the task entry. The system also creates a time-consuming calendar entry in the calendar of the user based on the determined length of time required to complete the task entry and existing calendar entries in the calendar of the user and provides the created time-consuming calendar entry for display to the user, wherein the created time-consuming calendar entry is visually distinct from other calendar entries in the calendar of the user.

The disclosed subject matter also relates to a machine-readable storage medium comprising machine-executable instructions for causing a processor to perform a method for scheduling tasks in a calendar of a user. The method includes receiving a task entry from a user and determining a length of time required to complete the task entry. The method further includes creating a time-consuming calendar entry in the calendar of the user based on the determined length of time required to complete the task entry and existing calendar entries in the calendar of the user and providing the created time-consuming calendar entry to the user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several aspects of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology provides a calendar and task management system that represents a length of time required to accomplish a task in a calendar of the user by creating time-consuming calendar entries for tasks. In addition to representing a task as a time-consuming calendar entry, the subject technology additionally schedules the calendar entry amongst the other scheduled events and tasks of the user. A single task may be split into several events on the calendar to accommodate user preferences or the existing state of the calendar of the user.

Scheduling tasks into the calendar of the user according to the subject technology may additionally involve consideration of other constraints such as minimum or maximum blocks of time that may be assigned to a specific type of task, constraints, preferences, deadlines, ranking of importance of a task based on deadlines or other criteria, and other scheduling conventions such as time of day or priority of the task. The calendar and task management application may customize the user's scheduling experience based on the user's previous interactions with the calendar and task management application.

The subject technology additionally provides a calendar and task management system that automatically determines the length of time that is required to complete a task based on parameters such as user input, default estimates, and averages of group behavior.

Figure 1:
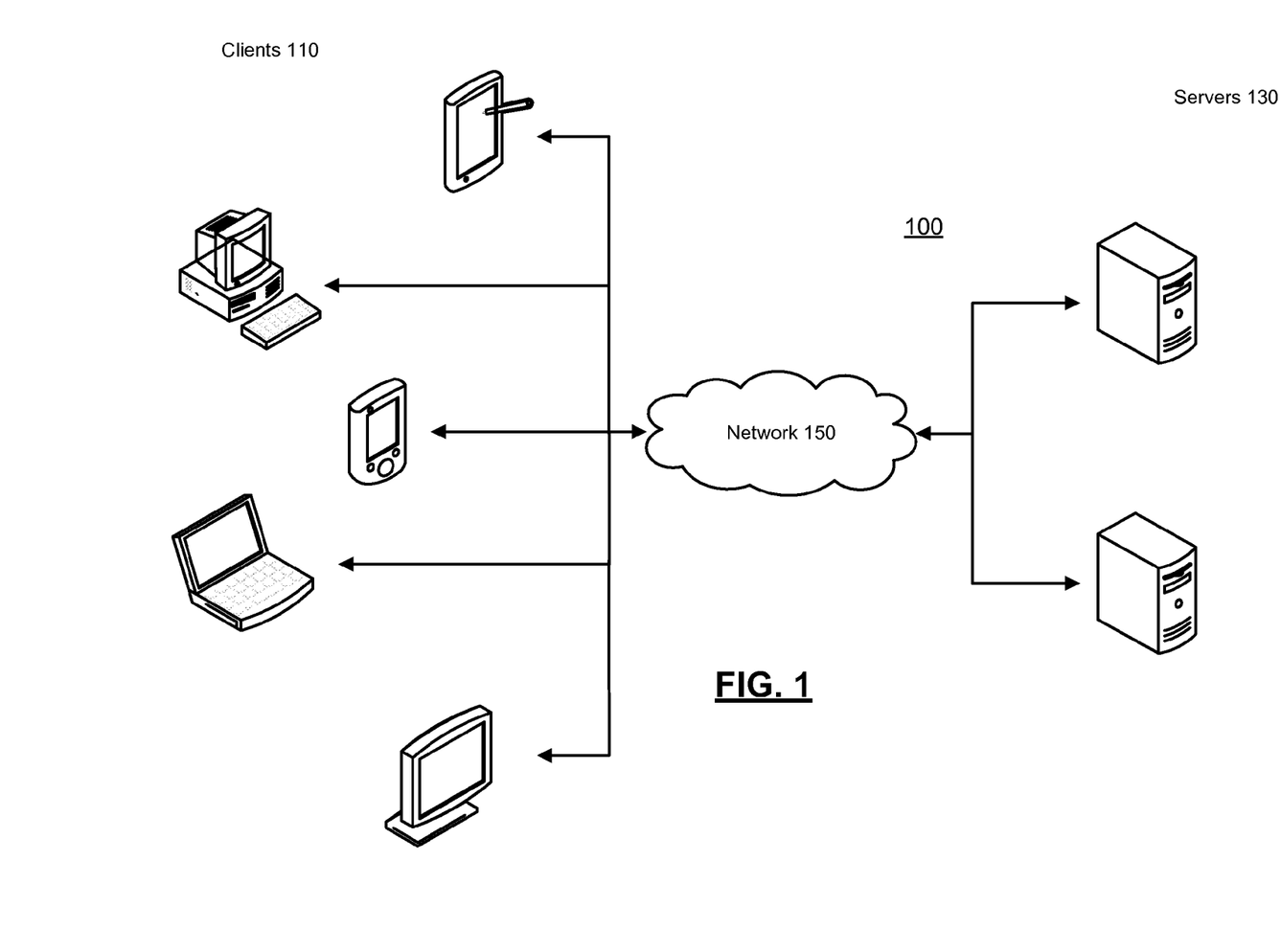
FIG. 1 illustrates an example system for scheduling tasks in a calendar of a user.

Turning to the drawings, FIG. 1 illustrates an example system 100 for scheduling tasks in a calendar of a user. The system 100 includes clients 110 and servers 130 connected over a network 150.

The system is comprised of client(s) 110, server(s) 130 and the network 150 in any combination or configuration that allows for scheduling tasks in a calendar of a user. Each of the clients 110 can be, for example, a desktop computer, a laptop computer, a mobile device (e.g., a smartphone, tablet computer, or PDA), a set top box (e.g., for a television), a television with one or more processors embedded therein or coupled thereto, a video game console, or any other device having a processor, memory, and communications capabilities. User input associated with creating, altering, or completing a task may be input from a client 110. The user may further access a display of the calendar through client 110.

In certain instances, different versions and/or configurations of a system that includes the subject technology as disclosed herein may also be available for download from a server 130 and subsequent installation on client 110. The servers 130 can be any device having a processor, memory, and communications capability for hosting the data for installing and hosting the system. Information associated with the calendar and task management system of the user may be stored on the server 130. Scheduling of task entries in the form of time-consuming calendar entries may additionally be performed by the server 130.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a ring network, a mesh network, a star-bus network, tree or hierarchical network, and the like. Task related user information from client 110 and time-consuming calendar entries as created by the server 130 may be transmitted over network 150.

Figure 2:
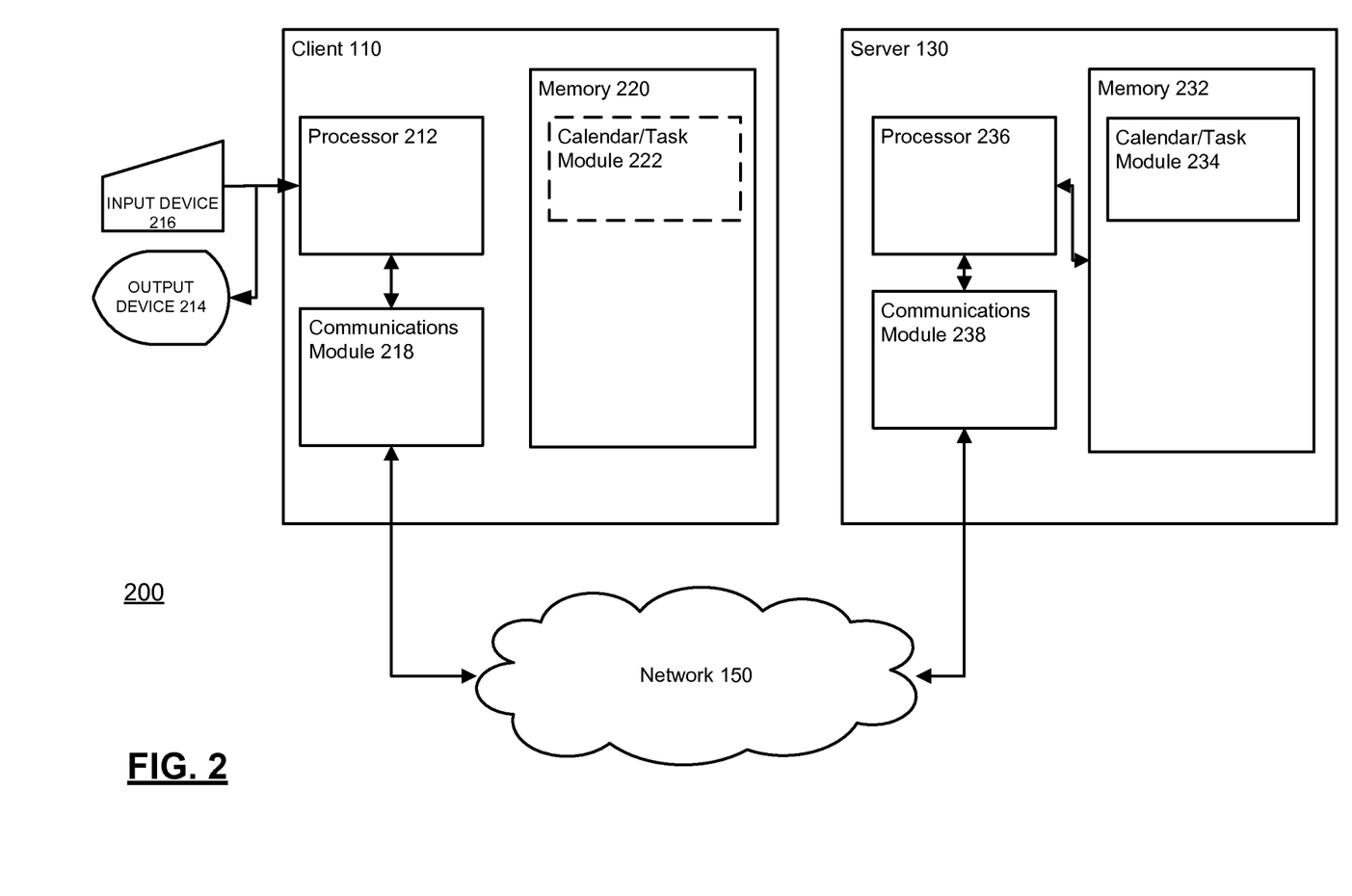
FIG. 2 is a block diagram illustrating an example client and server from the system of FIG. 1 according to certain aspects of the disclosure.

FIG. 2 is a block diagram illustrating an example client and server from the system 100 of FIG. 1 according to certain aspects of the disclosure. The client 110 and the server 130 are connected over the network 150 via respective communications modules 218 and 238 and are configured to interface with the network 150 to send and receive information, such as data, requests, responses, and commands to other devices on the network. The communications modules 218 and 238 can be, for example, modems or Ethernet cards.

The client 110 includes a processor 212, the communications module 218, and a memory 220 that may include a calendar/task module 222.

The processor 212 of the client 110 is configured to execute instructions, such as instructions physically coded into the processor 212, instructions stored in memory 220, or a combination of both. The input device 216 may provide input to processor 212 which is processed by a software module stored in memory 220. The input may then be sent through network 150 via communications module 218 to server 130, which receives the information through communications module 238. Calendar/task module 222 includes instructions for calendar and task scheduling, including the method of the subject technology. The calendar/task module 222 of FIG. 2 illustrates a single module, however calendar and task modules may be separate modules within memory 220.

Server 130 includes a processor 236, the communications module 238, and a memory 232 that may include a calendar/task module 234. Calendar/task module 234 includes instructions for calendar and task scheduling, including the instructions to implement all or a portion of the method of the subject technology. The calendar/task module 234 of FIG. 2 illustrates a single module, however calendar and task modules may be separate modules within memory 232. Processor 236 is configured to execute instructions, such as instructions physically coded into the processor 236, instructions stored in memory 232, or a combination of both. Processor 236 processes information from calendar/task module 234 and sends information through communications module 238, through network 150, to client 110 to be displayed on output device 214.

Figure 3:
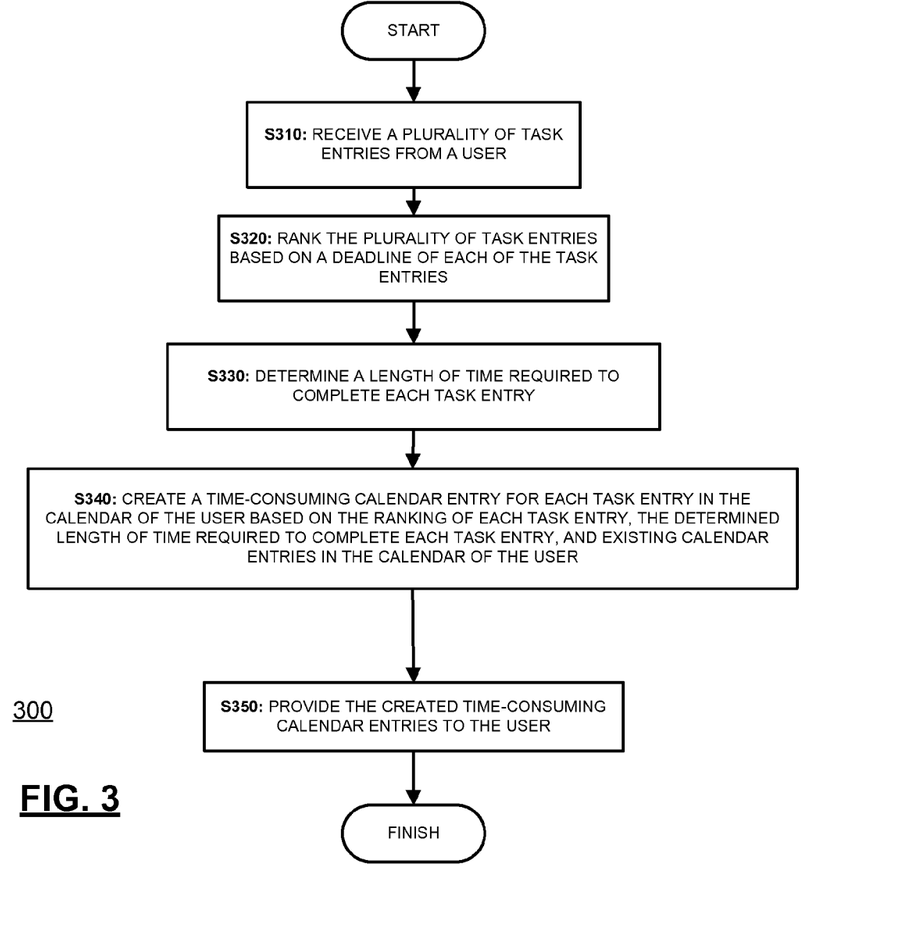
FIG. 3 illustrates an example process for scheduling tasks in a calendar of a user.

FIG. 3 illustrates an example process 300 for scheduling tasks in a calendar of a user as shown by the example client 110 and server 130 of FIG. 2.

The process begins with step S310 when the calendar/task module 222 or 234 receives one or more task entries. A user may provide task entries via an input device 216 of the client 110. The user may also provide task entries by transferring task entries from one client to another client, or the user may provide task entries by importing tasks from another task application or other related applications.

The term "task entry" as used herein encompasses its plain and ordinary meaning, including, but not limited to, an electronic entry in a task managing computer application that refers to an undertaking or action that the user wishes to monitor or complete in the future. A task entry may contain information such as a title of a task and a description of the task to be completed. Additional information associated with the task entry may include any type of information such as, but not limited to, location information, actions that are required to complete the task, other individuals that are involved in the task, and deadline information.

Time constraint information may be included in the task entry. Time constraint information may be automatically determined or may be explicitly entered by the user. Any type or number of time constraints may be included with the task entry including, but not limited to: a maximum length of time for a single time-consuming calendar entry for the task entry, a minimum length of time between a last time-consuming calendar entry for the task entry and a deadline of the task entry, a maximum number of separate time-consuming calendar entries for the task entry, or a minimum number of separate time-consuming calendar entries for the task entry.

In step S320, the calendar/task module 222 or 234 ranks task entries based on a deadline of each of the task entries. The ranking of the task entries may also be based on an importance level of the task entry, a type of task associated with the task entry, or other criteria. The server may adjust some or all of the calendar entries associated with task entries upon the entry of a new task, such that most or all calendar entries associated with task entries may be scheduled in consideration of each task's respective constraints.

In step S330, the calendar/task module 222 or 234 determines a length of time required to complete each task entry. The calendar/task module 222 or 234 may determine the length of time required to complete the task entry based on user input in the form of user preferences or specified constraints, past interactions of the user, default estimates, or averages based on group behavior.

The calendar/task module 222 or 234 may associate averages based on group behavior with specific types of tasks and constraints. The user can, at any time, adjust privacy settings to selectively limit the types of user information that is accessed by the subject technology.

In step S340, the calendar/task module 222 or 234 creates a time-consuming calendar entry for each task entry in the calendar of the user based on the ranking of each task entry, the determined length of time required to complete each task entry, and existing calendar entries in the calendar of the user. Multiple calendar entries may be created for each task entry such that the determined length of time to complete the task is divided among the multiple time-consuming calendar entries. Any combination of additional conditions, such as time constraints, may also be considered in creating the time-consuming calendar entry for each task entry.

Time constraint information may be associated with a type of task, the specific task associated with the task entry, or automatically determined from historical task completion information. Time constraint information may consist of a maximum and/or minimum length of time for a single, time-consuming calendar entry for a task entry, a minimum length of time between a last time-consuming calendar entry for each task entry and the deadline of the respective task entry, or a maximum and/or minimum number of separate time-consuming calendar entries for each task entry.

The maximum and minimum length of time for a single, time-consuming calendar entry for a task entry may reflect a user preference for the maximum or minimum consecutive length of time for any one calendar entry associated with the task entry. A task entry such as "write 30 page paper: theories on the lack of migratory patterns of pigeons" may require a total length of 60 hours to complete the task entry. Although it may be possible to schedule a single time-consuming calendar entry in the calendar of the user, multiple calendar entries may be created for the task such that the total length of time to complete the task is divided among multiple calendar entries for the task of writing the paper. The maximum length of time for each calendar entry may be six hours. Thus, in this example, ten or more calendar entries must be created in order to schedule the task entry. The maximum and minimum length of time for each calendar entry may be automatically determined or may be provided by the user.

The minimum and/or maximum length of time between a last time-consuming calendar entry for a task entry and the deadline of the task entry may reflect a user preference for how close to the deadline the user would like to schedule the task. For the above task entry for writing the 30 page paper, the minimum amount of time between the last time-consuming calendar entry for a task entry and the task entry deadline may be one day. Thus, in this example, if the deadline associated with the task entry is 5 p.m., May 24th, the last calendar entry associated with the task may be scheduled to end prior to 5 p.m., May 23rd.

In order to establish the minimum and/or maximum length of time between a last time-consuming calendar entry for a task entry and the deadline, the beginning time of the last time-consuming calendar entry may be used as the point of time from which to measure the constraint. A midpoint or an end point in the last time-consuming calendar entry may also be used as the measuring point. The minimum amount of time parameter for a task that has a deadline specified only by day may be measured from any time during that day. The time for measuring for a deadline specified only by day may be set by user preferences. This constraint may apply only to the original calendar entry (or original group of calendar entries) created for the task entry to provide the opportunity for rescheduling the task entry, should the original calendar entries pass without completion of the task entry. Alternatively, this constraint may apply to rescheduled calendar entries associated with the task entry as well. In the event that this minimum amount of time approaches without completion of the task entry, a notification may be sent to the user.

The maximum and minimum number of separate time-consuming calendar entries for each task entry may additionally reflect a user preference. For the above task of writing the 30 page paper, the user may prefer to only work on the paper in no more than six different sittings. The maximum number of separate time-consuming calendar entries may be set to six; accordingly, a maximum of six calendar entries are created, each with a duration of ten hours.

The length of time required to complete a task entry may also be determined based on user provided information or may be provided through historical task completion information. Historical task completion information may include the user's previously completed tasks and task information regarding the user's tasks that were not completed by the respective task's deadline. Additionally, the subject technology may include machine-learning algorithms to automatically customize the user's scheduling experience based on past interactions.

The process ends following step S350, in which the calendar/task module 222 or 234 provides the created time-consuming calendar entries to the user. The server 130 may provide the calendar entries to the user by transmitting data through network 150 to client 110, such that the created time-consuming calendar entries are provided for display on a calendar of a user on an output device 214 of client 110.

The created time-consuming calendar entries may be visually distinct from calendar entries that are not associated with tasks of the user. For instance, created time-consuming calendar entries may be distinguished from calendar entries that are not associated with tasks by a visual indicator such as a color, an icon, text, or the like. In this manner, others viewing the user's calendar to determine availability for a meeting can readily determine the time-consuming calendar entries associated with tasks, which may be easily rescheduled, and the calendar entries that are not associated with tasks, which may not be easily rescheduled. Time-consuming calendar entries that can no longer be rescheduled based on the constraints associated with completing the associated tasks may be visually distinct from time-consuming calendar entries that can still be rescheduled. For example, time consuming calendar entries that can no longer be rescheduled may be displayed similarly or the same as calendar entries that are not associated with tasks.

Time-consuming calendar entries on the user's calendar may be hidden from others viewing the user's calendar to determine the user's availability. The time-consuming calendar entries that are hidden may be limited to those that can be rescheduled within the constraints associated with completing the associated tasks. The time-consuming calendar entries that can no longer be rescheduled may be displayed to others viewing the user's calendar either visually distinct from calendar entries not associated with tasks of the user, or in a similar or identical manner as calendar entries not associated with tasks of the user. The selective and/or differential display of time-consuming calendar entries may be based on user-selected preferences made in the calendar and task management application.

If a time-consuming calendar entry for a task entry passes without the user marking the task entry as complete, portions of the above process may be repeated to create one or more new calendar entries for the task, or to reschedule the task entry in its entirety. For instance, if three calendar entries were originally created for a single task entry and the first calendar entry passes without completion, a new calendar entry may be created so that the total time for completion of the task is represented in the portions of the calendar representing time that has not yet elapsed. The duration of one or both of the remaining original calendar entries may be lengthened to accommodate the total duration of the task entry, following the passing of the first calendar entry without completion.

Changes in data associated with the task entry may also trigger the rescheduling or adjustment of the calendar entries for the task entry. For instance, changes in data associated with the task entry may include a change in the deadline to complete the task, the importance level of the task, the time required to complete the task, or a change to any one or more constraints associated with the type of task or task entry itself. Adjustments that may be made to calendar entries may include, but are not limited to, moving a calendar entry to a different time and/or day, shortening or lengthening the duration of a calendar entry, splitting a single calendar entry into multiple entries, consolidating multiple calendar entries for the same task entry into fewer calendar entries, changing a visual component associated with the display of the calendar entry in the calendar of the user, and the like.

Adjustments may be made to time-consuming calendar entries when a conflicting calendar entry not associated with a task is entered into the calendar of the user. For example, a time-consuming calendar entry may be rescheduled automatically upon receipt of an appointment request that conflicts with the time-consuming calendar entry. Alternatively, the time-consuming calendar entry may not be rescheduled unless and until the user accepts the appointment request. In this regard, the user may be notified of the conflict between the time-consuming calendar entry and the appointment request before the time-consuming calendar entry is rescheduled. If the time-consuming calendar entry cannot be rescheduled based on constraints associated with the associated task, or based on a user-selected preference, an appointment request that conflicts with the time-consuming calendar entry may be automatically declined. Rather than automatically decline the conflicting appointment request, both the time-consuming calendar entry and the appointment request may be displayed with an indicator of the conflict until the user takes some action to address the conflict, such as accepting the appointment.

If a time-consuming calendar entry cannot be created based on the determined length of time required to complete the task entry, the deadline associated with the task entry, and/or existing calendar entries in the calendar, a notification may be sent to the user. An existing calendar entry may be a previously created time-consuming calendar entry associated with a task entry or may be a calendar entry that is not associated with a task of the user. A calendar entry for a task entry may not be able to be created if the determined length of time required to complete the task is longer than the time available in the calendar of the user before the deadline elapses. Available time in the calendar may refer only to time in the calendar that has no other entries or events associated with it, may refer to time in the calendar that is not occupied by calendar entries or events that do not allow overlapping of scheduling, or may refer to the total amount of time in the calendar prior to the deadline, regardless of any events or entries.

Figure 4:
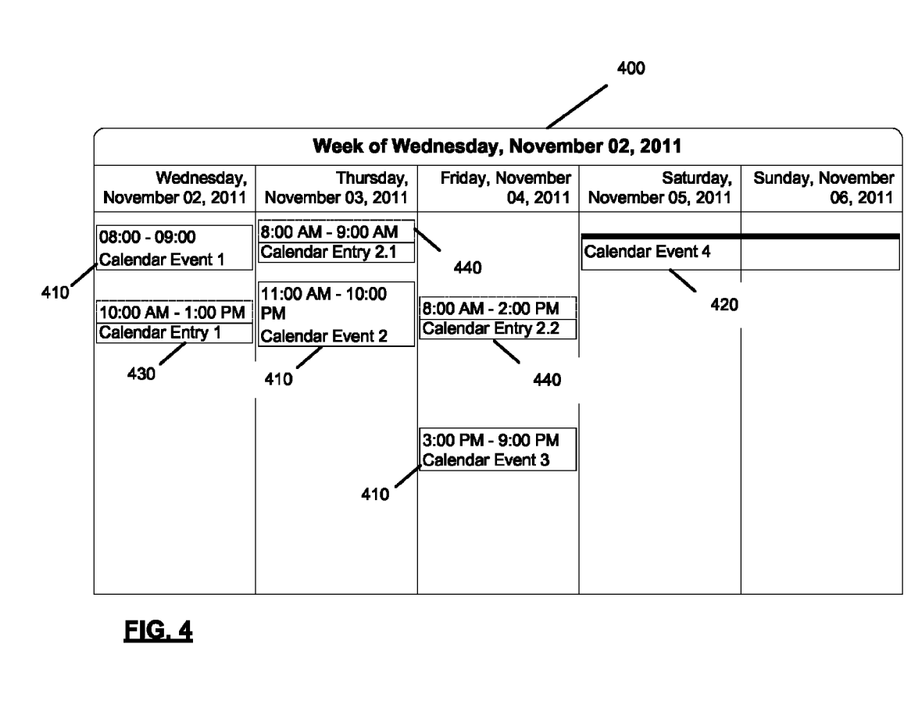
FIG. 4 is an example illustration of a user interface as it relates to one aspect of the subject technology.

FIG. 4 is an example calendar 400 of a user interface as it relates to one aspect of the subject technology.

Calendar 400 of the user may, in one view, display one week of events. The calendar 400 of the user may already contain time-consuming calendar entries for calendar events 410 and 420 that are not associated with tasks. Pre-existing calendar events 410 may have specified start and end times. Calendar events, such as calendar event 420, may take place over several days, and may designate specific times or may designate the entire day or days as the start and end times. Calendar events 410 and 420 may be created such that no other entry may be scheduled that conflicts with the designated time of the calendar events 410 and 420. Calendar entries 430 and 440 are calendar entries that have been created from tasks of the user. The calendar entries 430 and 440 have been scheduled so that they do not interfere with pre-existing calendar events 410 and 420. Calendar entries 440 represent multiple calendar entries for the same task. The total length of time allocated for calendar entries 440 is the determined total length of time required to complete the task. The total length of time may be divided evenly, may be divided based on the pre-existing calendar events, or may be divided in consideration of other constraints, such as maximum and minimum lengths of time per calendar entry, maximum and minimum numbers of calendar entries per task entry, the deadline of the task, or the like. The division of a single task entry into multiple calendar entries may be based on any combination of restraints or conditions.

Calendar entries 430 and 440 representing scheduled task entries are visually differentiated from calendar events 410 and 420 through the use of a dashed line. Other forms of visual differentiation may be used such as color, icons, font, text, and the like and may be selected by a user.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject technology can be implemented as sub-parts of a larger program while remaining distinct software aspects of the subject technology. In some implementations, multiple software aspects can also be implemented as separate programs. Finally, any combination of separate programs that together implement a software aspect described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
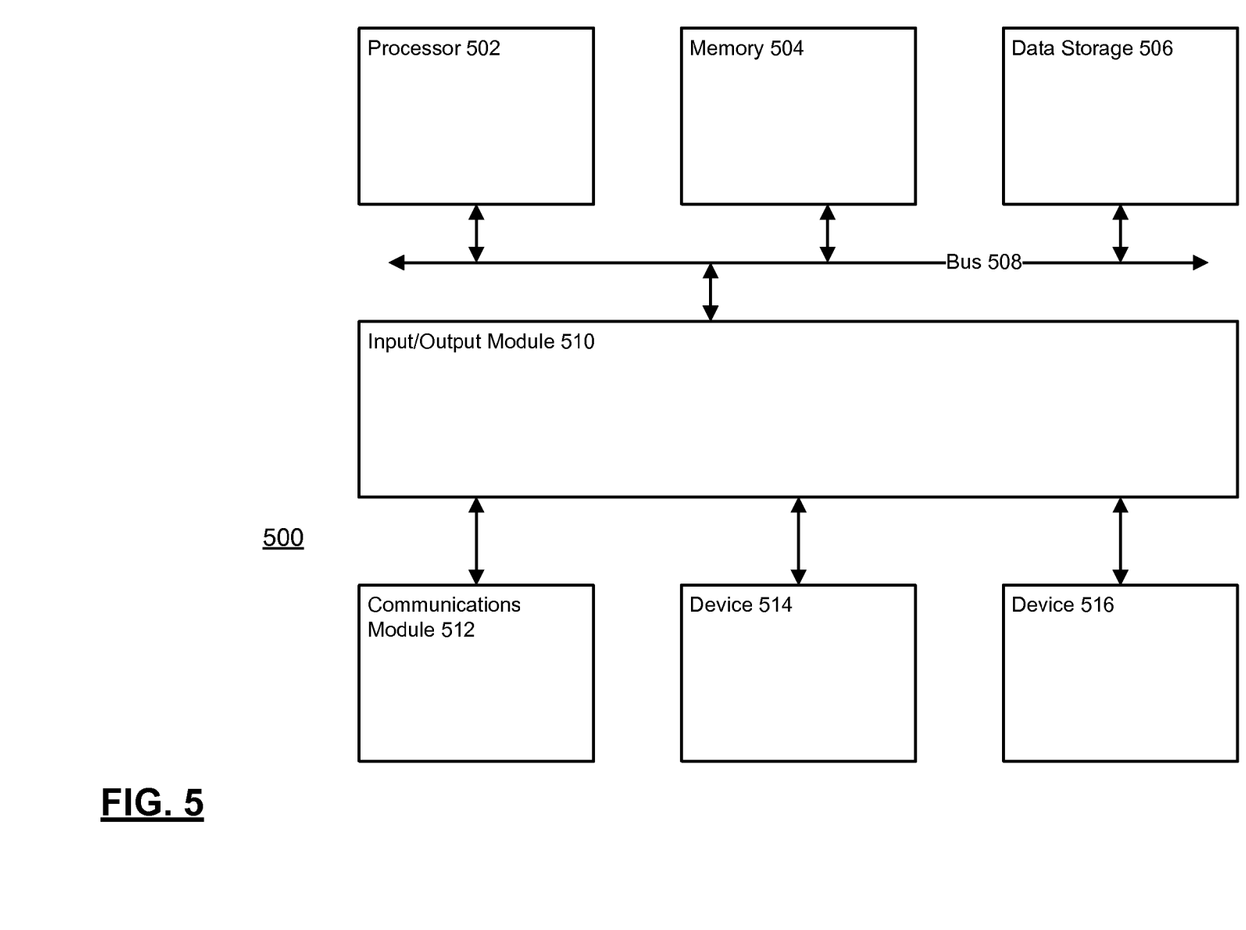
FIG. 5 is a block diagram illustrating an example computer system with which the client and server of FIG. 2 can be implemented.

FIG. 5 conceptually illustrates an electronic system with which some implementations of the subject technology are implemented. Electronic system 500 can be a computer, phone, PDA, or any other sort of electronic device. Such an electronic system includes various types of computer-readable media and interfaces for various other types of computer-readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject technology. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject technology use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as a random access memory. System memory 504 stores some of the instructions and data that the processor needs at runtime. In some implementations, the processes of the subject technology are stored in system memory 504, permanent storage device 502, and/or ROM 510. For example, the various memory units include instructions for providing for display of a message within a social networking website in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interface 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers such as a local area network ("LAN"), a wide area network ("WAN"), or an Intranet, or a network of networks, such as the Internet. Any or all components of electronic system 500 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Aspects of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology. Features described under one heading or one subheading of the subject disclosure may be combined, in various embodiments, with features described under other headings or subheadings. Further, it is not necessarily the case that all features under a single heading or a single subheading are used together in embodiments.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method for scheduling tasks in a calendar of a user, the method comprising:
   receiving a plurality of task entries from a user;
   ranking the plurality of task entries based on a deadline of each of the task entries;
   determining a length of time required to complete each task entry;
   receiving time constraint information associated with each task entry, wherein the time constraint information is based on a type of task of each task entry and includes at least one of: a maximum length of time for a single time-consuming calendar entry for each task entry, a minimum length of time between a last time-consuming calendar entry for each task entry and the deadline of the respective task entry, a maximum number of separate time-consuming calendar entries for each task entry, or a minimum number of separate time-consuming calendar entries for each task entry;
   creating, by one or more processors, a time-consuming calendar entry for each task entry in the calendar of the user based on the ranking of each task entry, the determined length of time required to complete each task entry, the time constraint information associated with each task entry, and existing calendar entries in the calendar of the user; and
   providing the created time-consuming calendar entries to the user.

2. The method of claim 1, further comprising:
   creating a plurality of time-consuming calendar entries for one of the plurality of task entries, wherein the determined length of time required to complete the one of the plurality of task entries is divided among the plurality of time-consuming calendar entries.

3. The method of claim 1, wherein the length of time required to complete each task entry is determined based on historical task completion information.

4. The method of claim 1, wherein the length of time required to complete each task entry is determined based on user provided data.

5. The method of claim 1, further comprising:
creating a new time-consuming calendar entry for one of the plurality of task entries if an original time-consuming calendar entry for the task entry passes without completion of the task entry.

6. The method of claim 1, further comprising:
adjusting the time-consuming calendar entry for one of the plurality of task entries based on a change in data associated with the task entry.

7. The method of claim 1, further comprising:
notifying the user if a time-consuming calendar entry cannot be created based on the determined length of time required to complete the task entry, the deadline associated with the task entry, and existing calendar entries in the calendar.

8. The method of claim 1, further comprising:
providing the created time-consuming calendar entries for display in the calendar of the user, wherein the created time-consuming calendar entries are visually distinct from other calendar entries in the calendar of the user.

9. A system for scheduling tasks in a calendar of a user, the system comprising:
one or more processors; and
a memory containing processor-executable instructions that, when executed by the one or more processors, cause the system to:
receive a task entry from a user;
determine a deadline of the task entry;
determine a length of time required to complete the task entry;
receive time constraint information associated with the task entry, wherein the time constraint information is based on a type of task of the task entry and includes at least one of: a maximum length of time for a single time-consuming calendar entry for the task entry, a minimum length of time between a last time-consuming calendar entry for the task entry and a deadline of the task entry, a maximum number of separate time-consuming calendar entries for the task entry, or a minimum number of separate time-consuming calendar entries for the task entry;
create a time-consuming calendar entry in the calendar of the user based on the determined length of time required to complete the task entry, the deadline of the task entry, the time constraint information associated with the task entry, and existing calendar entries in the calendar of the user; and
provide the created time-consuming calendar entry for display to the user, wherein the created time-consuming calendar entry is visually distinct from other calendar entries in the calendar of the user.

10. The system of claim 9, wherein the system is further caused to:
create a plurality of time-consuming calendar entries for the task entry, wherein the determined length of time required to complete the task entry is divided among the plurality of time-consuming calendar entries.

11. The system of claim 9, wherein the length of time required to complete the task entry is determined based on historical task completion information.

12. The system of claim 9, wherein the length of time required to complete the task entry is determined based on user provided data.

13. The system of claim 9, wherein the system is further caused to:
create a new time-consuming calendar entry for the task entry if an original time-consuming calendar entry for the task entry passes without completion of the task entry.

14. The system of claim 9, wherein the system is further caused to:
notify the user if a time-consuming calendar entry cannot be created based on the determined length of time required to complete the task entry, a deadline associated with the task entry, and existing calendar entries in the calendar.

15. A non-transitory machine-readable storage medium storing machine-executable instructions for causing a processor to perform a method for scheduling tasks in a calendar of a user, the method comprising:
receiving a task entry from a user;
determining a length of time required to complete the task entry;
receiving time constraint information associated with the task entry, wherein the time constraint information is based on a type of task of the task entry and includes at least one of: a maximum length of time for a single time-consuming calendar entry for the task entry, a minimum length of time between a last time-consuming calendar entry for the task entry and a deadline of the task entry, a maximum number of separate time-consuming calendar entries for the task entry, or a minimum number of separate time-consuming calendar entries for the task entry;
creating a time-consuming calendar entry for the task entry in the calendar of the user based on the determined length of time required to complete the task entry, the time constraint information associated with the task entry, and existing calendar entries in the calendar of the user; and
providing the created time-consuming calendar entry to the user.

16. The non-transitory machine-readable storage medium of claim 15, further comprising:
creating a plurality of time-consuming calendar entries for the task entry, wherein the determined length of time required to complete the task entry is divided among the plurality of time-consuming calendar entries.

17. The non-transitory machine-readable storage medium of claim 15, wherein the length of time required to complete the task entry is determined based on historical task completion information.

18. The non-transitory machine-readable storage medium of claim 15, wherein the length of time required to complete the task entry is determined based on user provided data.

19. The non-transitory machine-readable storage medium of claim 15, further comprising:
creating a new time-consuming calendar entry for the task entry if an original time-consuming calendar entry for the task entry passes without completion of the task entry.

20. The non-transitory machine-readable storage medium of claim 15, further comprising:
adjusting the time-consuming calendar entry based on a change in data associated with the task entry.

21. The non-transitory machine-readable storage medium of claim 15, further comprising:
notifying the user if a time-consuming calendar entry cannot be created based on the determined length of time required to complete the task entry, a deadline associated with the task entry, and existing calendar entries in the calendar.

22. The non-transitory machine-readable storage medium of claim 15, further comprising:
   ranking the task entry against another task entry based on a respective deadline of each task entry prior to creating the time-consuming calendar entry; and
   creating a time-consuming calendar entry for the task entry based on the ranking of the task entry.

23. The non-transitory machine-readable storage medium of claim 15, wherein the created time-consuming calendar entry is hidden from view of others viewing the calendar of the user.

\* \* \* \* \*